United States Patent [19]

Kawano et al.

[11] Patent Number: 5,613,168
[45] Date of Patent: Mar. 18, 1997

[54] APPARATUS FOR ADJUSTING POSITION OF LENS IN CAMERA

[75] Inventors: Kiyoshi Kawano; Hisashi Tatamiya, both of Tokyo, Japan

[73] Assignee: Asahi Kogaku Kogyo Kabushiki Kaisha, Tokyo, Japan

[21] Appl. No.: 421,529

[22] Filed: Apr. 13, 1995

[30] Foreign Application Priority Data

Apr. 15, 1994 [JP] Japan .................................. 6-077184

[51] Int. Cl.⁶ .............................. G03B 13/32; G02B 7/04
[52] U.S. Cl. ........................ 396/146; 396/529; 359/699; 359/700; 359/823
[58] Field of Search .......................... 354/195.1, 195.12, 354/286, 400; 359/699, 700, 701, 822, 823, 694

[56] References Cited

U.S. PATENT DOCUMENTS

| | | | |
|---|---|---|---|
| 4,764,783 | 8/1988 | Tanaka | 354/195.1 |
| 4,910,544 | 3/1990 | Nomura | 354/195.12 |
| 5,144,494 | 9/1992 | Sekiguchi | 359/700 |
| 5,307,104 | 4/1994 | Hamasaki | 354/286 |

*Primary Examiner*—A. A. Mathews
*Attorney, Agent, or Firm*—Greenblum & Bernstein, P.L.C.

[57] ABSTRACT

A position adjusting apparatus for adjusting a position of a lens frame of a camera, which holds a focusing lens group, in an optical axis direction. This apparatus includes a lens frame supporting member which is rotatable relative to the lens frame, a guide which moves the lens frame in the optical axis direction during the rotational adjustment of the lens frame, and a friction mechanism which normally prevents the lens frame and the lens frame supporting member from rotating relative to each other due to a frictional force, and which permits the lens frame and the lens frame supporting member to rotate relative to each other against the frictional force when a predetermined adjusting force is applied thereto.

20 Claims, 6 Drawing Sheets

APPARATUS FOR ADJUSTING POSITION OF LENS IN CAMERA

BACKGROUND OF THE INVENTION

1. Field of the Invention

The present invention relates to an apparatus for adjusting a position of a lens during assembly of a camera.

2. Description of the Related Art

In general, in a lens shutter type camera having an automatic focusing mechanism, a focus adjusting ring (focusing ring) is linearly moved in the optical axis direction or is rotated about the optical axis to move a focusing lens group in the optical axis direction by a displacement corresponding to an object distance during the focusing operation. The focusing lens group is held by a lens frame which is fitted in the focusing ring.

In such a known camera, the lens position is adjusted during the assembly of the camera. In the position adjustment, the focusing ring is held to move in the optical axis direction together with the lens frame without rotating about the optical axis, so that the lens frame is moved in the optical axis direction with respect to the camera body to adjust the axial position of the lens frame at an optimum position. After the axial position of the lens frame is adjusted, the lens frame is secured to the focusing ring by means of an adhesive or screws, etc. Consequently, the relative position of the focusing ring, the lens frame and the camera body is appropriately determined.

In a conventional positioning mechanism as mentioned above, it is necessary to maintain the fixed relative position between the lens frame and the focusing ring until the lens frame is firmly connected to the focusing ring by the adhesion of the adhesive, which is cured after the position of the lens frame with respect to the camera body is adjusted, during the securing operation of the lens frame to the focusing ring. However, this is a troublesome and time-consumable operation.

In an adjustment of the lens position in a pan-focus type of lens shutter camera, the lens frame is moved in the optical axis direction to adjust the axial position thereof with respect to the camera body, and thereafter, the lens frame is firmly connected to a securing portion of the camera body to which the lens frame is to be secured by means of an adhesive or screws, etc. Also, in this adjustment operation, the lens frame must be held until the latter is firmly connected to the securing portion of the camera body after the adjustment of the lens frame with respect to the camera body is completed.

SUMMARY OF THE INVENTION

The primary object of the present invention is to provide a simple position adjusting apparatus for a lens in a lens shutter type camera in which an axial position of the lens can be easily adjusted by a simple mechanism.

To achieve the object mentioned above, according to the present invention, there is provided a position adjusting apparatus that adjusts a position of a lens frame of a camera which holds a focusing lens group in an optical axis direction, including a lens frame supporting member which is rotatable relative to the lens frame, a guide mechanism for moving the lens frame in the optical axis direction during the rotational adjustment of the lens frame, and a friction mechanism which normally prevents the lens frame and the lens frame supporting member from relatively rotating due to a frictional force and which permits the lens frame and the lens frame supporting member to relatively rotate against the frictional force when a predetermined adjusting force is applied thereto.

The present disclosure relates to subject matter contained in Japanese Patent Application No. 06-77184 (filed on Apr. 15, 1994) which is expressly incorporated herein by reference in its entirety.

BRIEF DESCRIPTION OF THE DRAWINGS

The invention will be described below with reference to the accompanying drawings, in which.

DESCRIPTION OF THE PREFERRED EMBODIMENT

Figure 1:
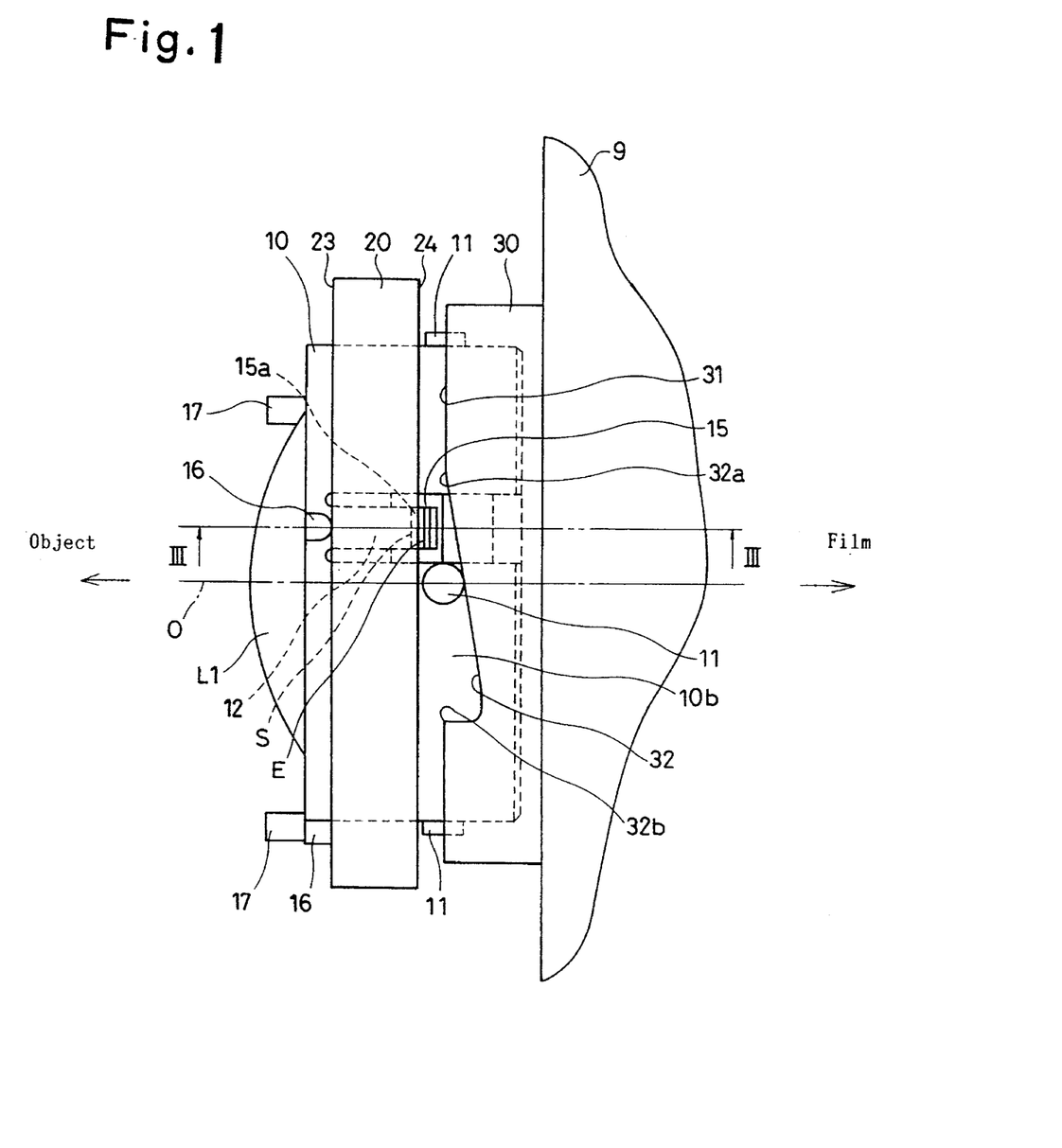
FIG. 1 is a front elevational view of a first embodiment of a position adjusting apparatus for a lens in a camera to which the present invention is applied.
Figure 2:
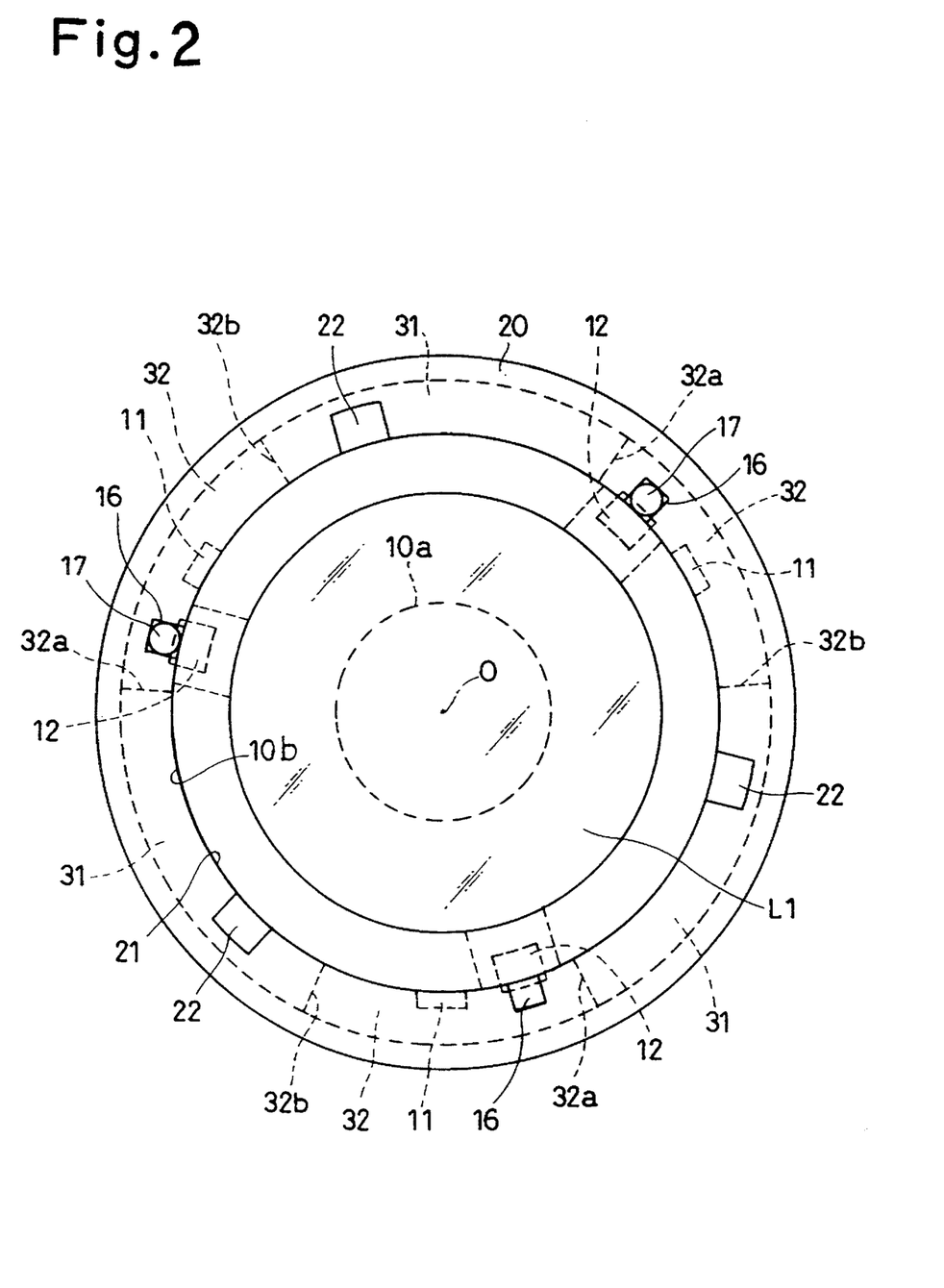
FIG. 2 is a side elevational view of FIG. 1, as viewed from the object side.
Figure 3:
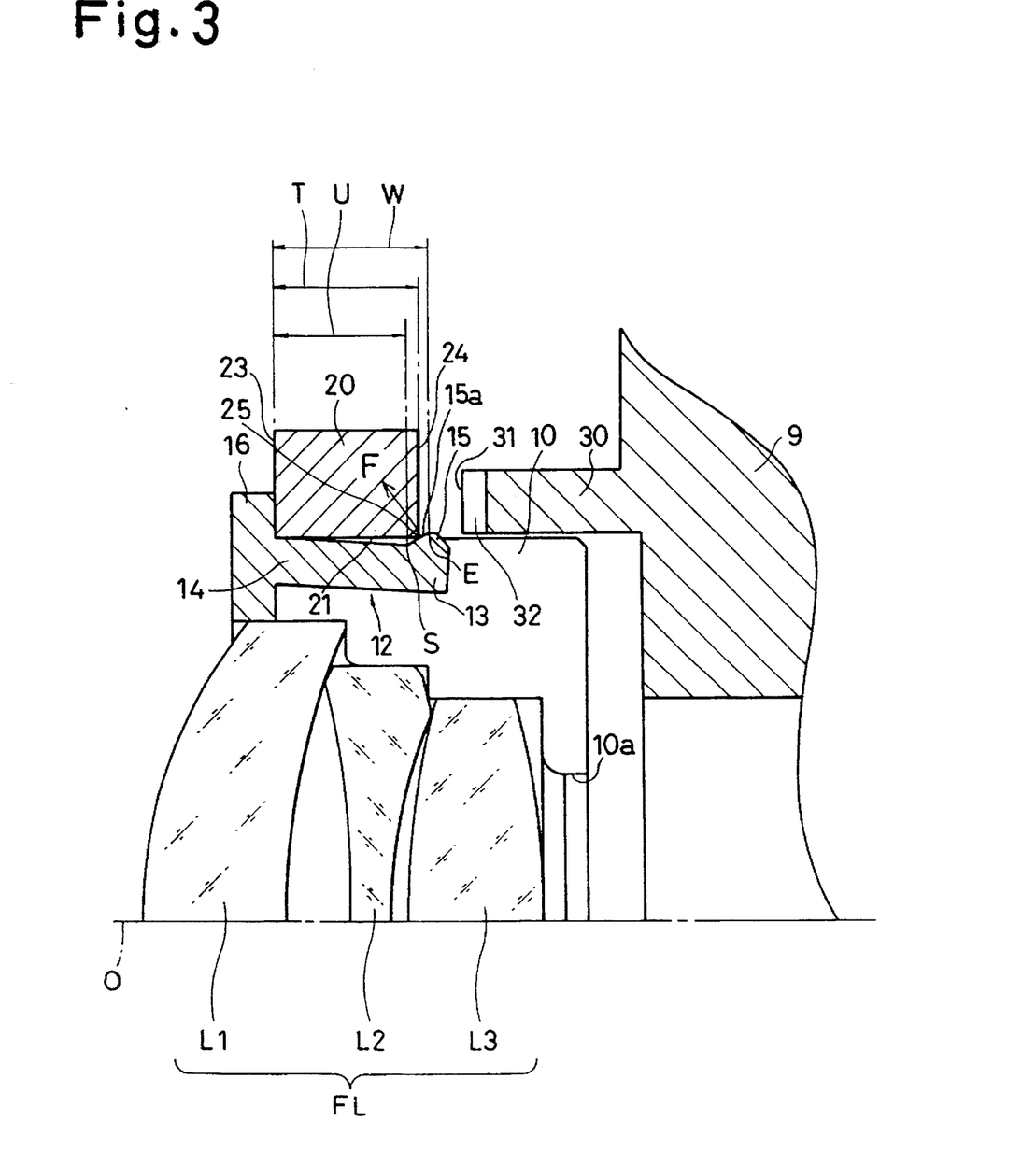
FIG. 3 is a sectional view of an upper half of a position adjusting apparatus, taken along the line III—III in FIG. 1.

FIGS. 1 through 3 show a lens position adjusting apparatus in a lens shutter type camera having an automatic focusing mechanism to which the present invention is applied. Since the subject of the present invention is addressed to the position adjusting mechanism, the entire structure of the camera is not shown.

The position adjusting apparatus includes an annular (circular) lens frame 10, a focusing ring (focus adjusting ring) 20 in which the annular lens frame 10 is fitted, and a stationary ring 30 which rotatably supports the lens frame 10. Upon adjustment of the lens position during the assembly of the camera, the position of the lens frame 10 relative to the stationary ring 30 which is secured to a securing portion 9 of a camera body in the direction of the optical axis O is first adjusted, and thereafter, the lens frame 10 is adhered to the focusing ring 20 by means of an adhesive. The adjusting operation will be discussed below. In FIG. 1, the left side corresponds to the object side (or front side) and the right side corresponds to the film side (or rear side), respectively.

The stationary ring 30 secured to the securing portion 9 of the camera body is provided on the front end thereof with an end surface 31 in a plane normal to the optical axis O. The end surface 31 is provided with three cam surfaces (cam grooves) 32 which extend along the circumference of the circular stationary ring 30 whose center is located on the optical axis O and spaced at an equi-angular distance in the circumferential direction. Each of the cam surfaces 32 is inclined from one end 32a thereof toward the other end 32b, along the circumferential direction. That is, the depth of each cam surface 32 gradually increases from the one end 32a toward the other end 32b (toward the rear side).

The lens frame 10 is in the form of a generally circular cylinder in which a focusing lens group FL consisting of first, second and third lenses L1, L2 and L3 in this order from the object side is held, as shown in FIG. 3. The lens frame 10 is provided with an opening 10*a* which is located behind the third lens L3. The lens frame 10 is slidably fitted at the rear end thereof on the inner peripheral surface of the stationary ring 30. The lens frame 10 is provided, on the outer peripheral surface 10*b* thereof, with three radially projecting cam pins 11 which are spaced at an equi-angular distance along the circumference of a circle whose center is located on the optical axis O. The lens frame 10 is continuously rearwardly biased by a biasing member, such as a spring (not shown) so that the cam pins 11 abut against the corresponding cam surfaces 32 of the stationary ring 30. The biasing member, the cam pins 11 and the cam surfaces 32 constitute a guiding mechanism.

The lens frame 10 has three elastically deformable legs 12 integral therewith, which are spaced at an equi-angular distance along the circumference of a circle whose center is located on the optical axis O and which extend in the direction parallel with the optical axis O. The legs 12 have front ends 14 integral with the lens frame 10 and free ends (rear ends) 13 which extend rearwardly from the front ends. The free ends 13 are provided with bulged portions (projections) 15 that project therefrom in the radial and outward directions. The bulged portions 15 are provided on the front side thereof with oblique surfaces 15*a* which are gradually tapered in the radial and outward directions toward the rear side thereof. The lens frame 10 is made of, for example, synthetic resin, so that the legs 12 can be elastically deformed or deflected in the direction perpendicular to the optical axis O at the fulcrum defined by the front ends 14 of the legs 12. That is, the elastically deformable legs 12 are elastically bent or flexible at the front ends 14 like a cantilever.

The lens frame 10 is provided with three projections 16 which are spaced at an equi-angular distance along the circumference of a circle whose center is located on the optical axis O and which project in the radial and outward directions. The projections 16 are provided on the outer peripheral surface 10*b* of the lens frame 10 at the front end thereof, corresponding to the elastically deformable legs 12.

The lens frame 10 is also provided with two pins 17 provided on any two of the three projections 16 and extending in the forward direction therefrom.

The focusing ring 20 is rotated about the optical axis O through an angular displacement corresponding to an object distance which is measured by a photometer (not shown), by a driving mechanism (not shown) using a well known cam, etc. The focusing ring 20 is fitted on the lens frame 10. After the positional adjustment of the lens is completed, if the focusing ring 20 is rotated, the lens frame 10 secured to the focusing ring 20 is rotated together, so that the lens frame 10 and accordingly the focusing lens group FL are moved in the optical axis direction due to the biasing member (not shown) which continuously biases the cam pins 11, the cam grooves 32, and the lens frame 10 in the rearward direction. Thus, focusing is performed upon taking a picture.

The focusing ring 20 is provided on the inner peripheral surface 21 thereof with three grooves 22 which are spaced at an equi-angular distance along the circumference of a circle whose center is located on the optical axis O and which extend in a direction parallel with the optical axis O. The grooves 22 have open front and rear ends. The grooves 22 are shaped such that the cam pins 11 can be inserted therein when the focusing ring 20 is fitted onto the lens frame 10 from the rear side.

To fit the focusing ring 20 onto the lens frame 10, the cam pins 11 are inserted in the corresponding grooves 22. When the focusing ring 20 is appropriately fitted onto the lens frame 10, the front end surface 23 of the focusing ring 20 abuts against the projections 16, and the edge portion 25 of the focusing ring 20 defined by and between the rear end surface 24 and the inner peripheral surface 21 thereof abuts against the inclined surfaces 15*a* of the elastically deformable legs 12, as shown in FIGS. 1 and 3.

As can be seen in FIG. 3, the length U of the portions of the elastically deformable legs 12 that are defined between contact points at which the projections 16 contact the front end surface 23 of the focusing ring 20 and the start points S of the oblique surfaces 15*a* is shorter than the axial length T of the focusing ring 20 in the optical axis direction O. The length W of the portions of the elastically deformable legs 12 that are defined between the contact points at which the projections 16 contact the front end surface 23 of the focusing ring 20 and the terminal points E of the oblique surfaces 15*a* is longer than the axial length T of the focusing ring 20, i.e. U<T<W.

With this arrangement, when the focusing ring 20 is properly fitted on the lens frame 10, the latter is pressed against the focusing ring 20 in such a way that the oblique surfaces 15*a* of the legs 12 are pressed against the edge portion 25, that is, the elastically deformable legs 12 are slightly and elastically deflected or bent toward the optical axis O. Moreover, the press contact of the oblique surfaces 15*a* with the edge portion 25 causes the front end surface 23 of the focusing ring 20 to come into press contact with the projections 16. In this state, when the lens frame 10 is rotated, a rotation of the focusing ring 20 also takes place due to the frictional force F produced between the edge portion 25 and the oblique surfaces 15*a* and between the front end surface 23 and the projections 16.

The position adjusting apparatus for a lens in a camera, as constructed above operates as follows.

Figure 4:
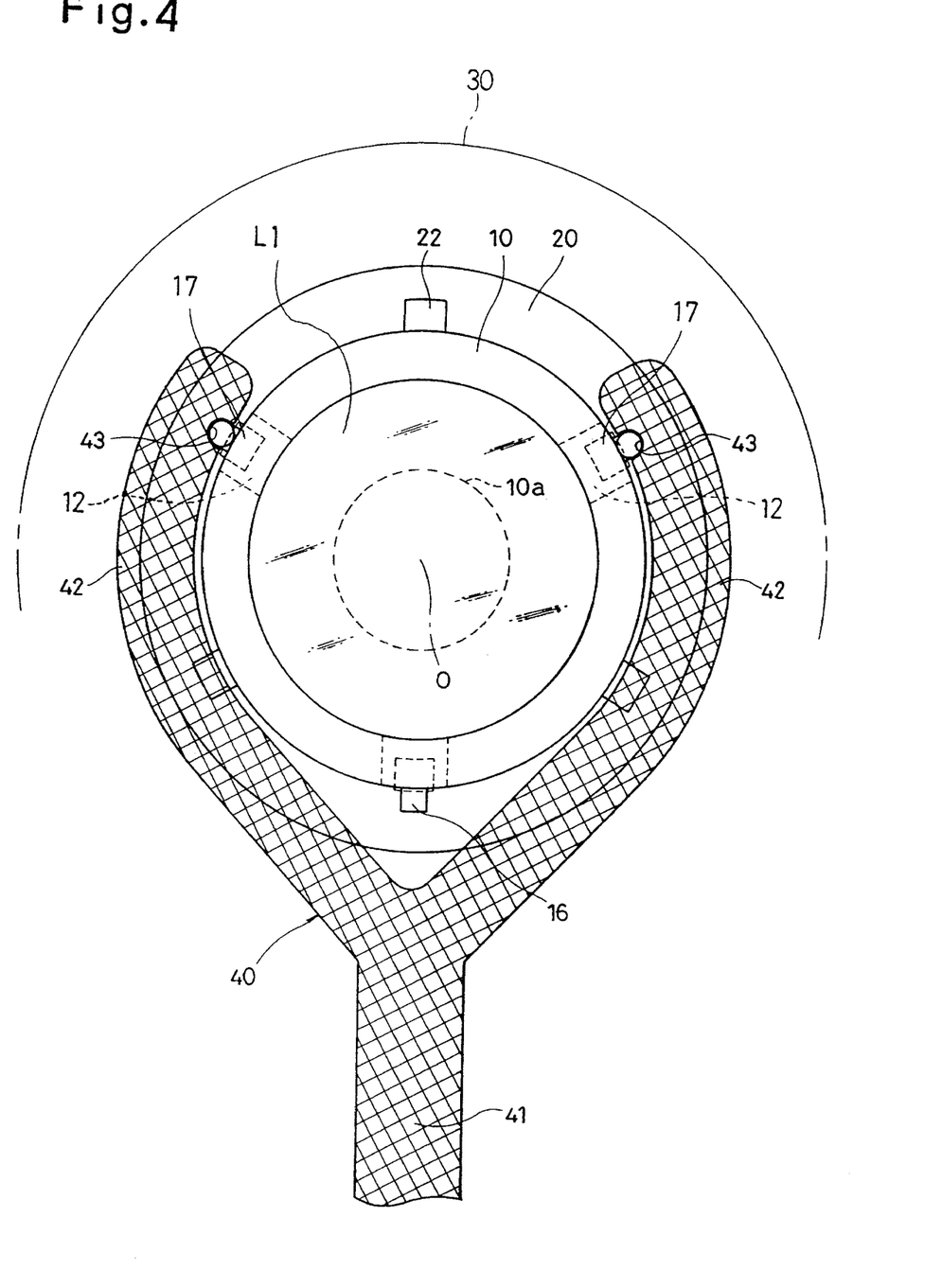
FIG. 4 is a schematic view of a lens frame and a special tool which is adapted to rotate the lens frame.

Upon adjustment of the position of the lens, the lens frame 10 is rotated by a generally Y-shaped special tool 40 as shown in FIG. 4 to adjust the axial position of the lens frame 10 with respect to the stationary ring 30 (e.g., adjustment of the back focal distance), after the biasing member (not shown) which continuously biases the lens frame 10, the focusing ring 20 and the stationary ring 30 in the rearward direction is appropriately incorporated, as shown in FIGS. 1 through 3. During the adjustment, the focusing ring 20 is held by a support or an engaging member (not shown) to move together with the lens frame 10 in the optical axis direction without rotating about the optical axis O.

The tool 40 is provided with a lever or handle 41 and a pair of bifurcated arms 42 connected to the handle 41. The arms 42 have engaging grooves 43 in which the corresponding pins 17 can be fitted. As can be seen in FIG. 4, when the lever 41 is rotated about the optical axis O against the frictional force F while engaging the pins 17 in the corresponding grooves 43, the lens frame 10 is rotated. The rotation of the lens frame 10 causes the position of the lens frame 10 with respect to the stationary ring 30 in the optical axis direction O to change through the cam pins 11 and the cam surfaces 32. That is, the lens frame 10 is moved in the optical axis direction by rotating the lens frame 10 by the tool 40 to thereby adjust the axial position of the lens frame with respect to the stationary ring 30.

After the adjustment of the axial position of the lens frame 10 with respect to the stationary ring 30 is completed, the tool 40 is removed, and thereafter, the lens frame 10 is adhered to the focusing ring 20 by an adhesive (not shown). After that, the support or engaging member (not shown)

which supports the focusing ring 20 so as not to rotate is disengaged. Thus, the positional adjustment ends.

According to the present invention, since the elastically deformable legs 12 are continuously pressed against the focusing ring 20 even if the adjusting tool 40 is removed after the adjustment of the lens frame 10 relative to the stationary ring 30 in the optical axis direction is completed, no accidental movement of the lens frame 10 occurs, so long as the lens frame 10 is not rotated with respect to the focusing ring 20 against the frictional force F. Therefore, it is not necessary to continue holding the lens frame 10 by the adjusting tool 40 until the adhesive is cured, unlike the prior art. Furthermore, since the lens frame 10 is adhered to the focusing ring 20 by the adhesive in the illustrated embodiment, the position adjusting apparatus is comprised of a fewer number of components.

Figure 5:
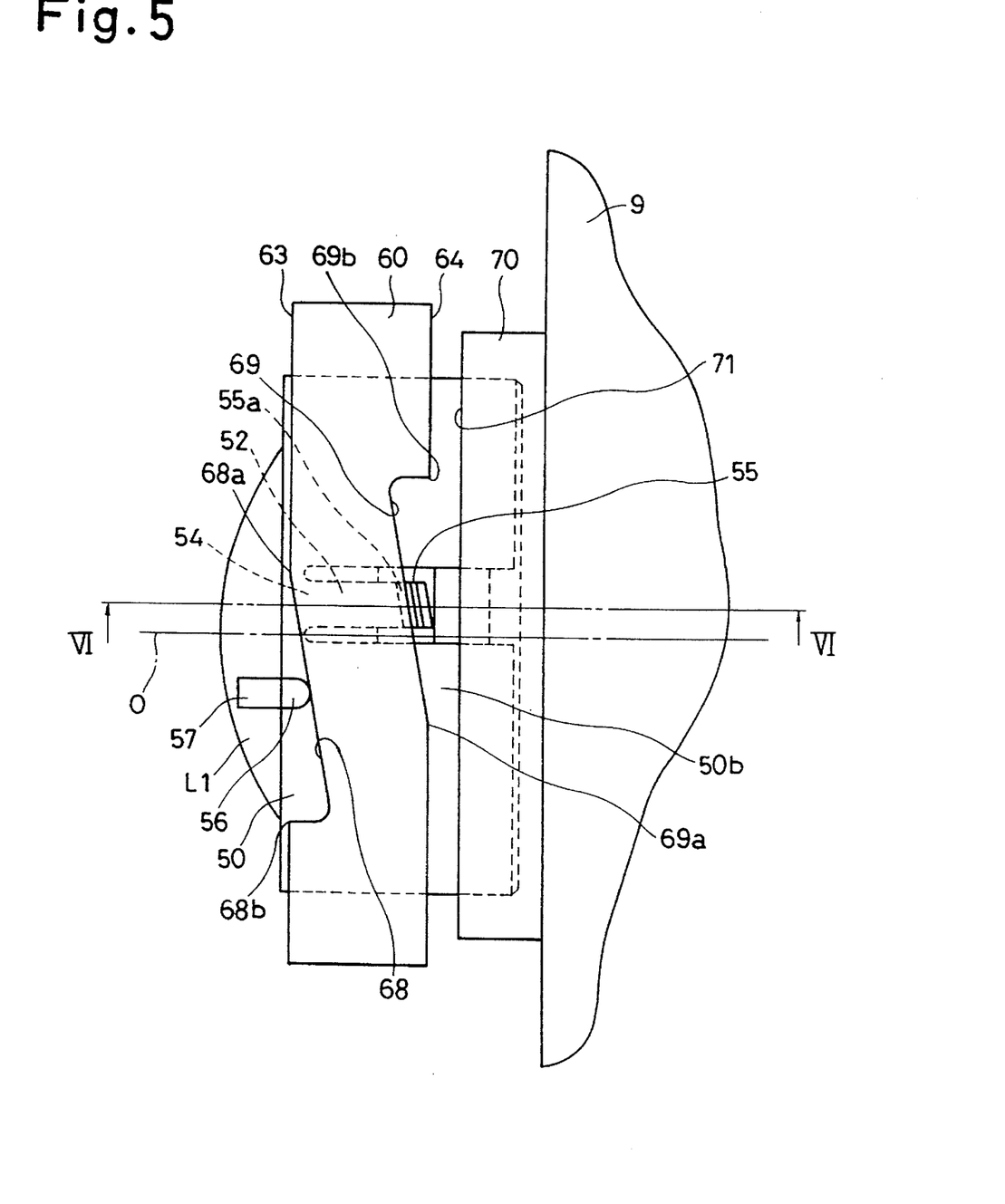
FIG. 5 is a front elevational view of another embodiment of a position adjusting apparatus for a lens in a camera to which the present invention is applied; and, FIG. 6 is a sectional view of an upper half of a position adjusting apparatus, taken along the line VI—VI in FIG. 5.
Figure 6:
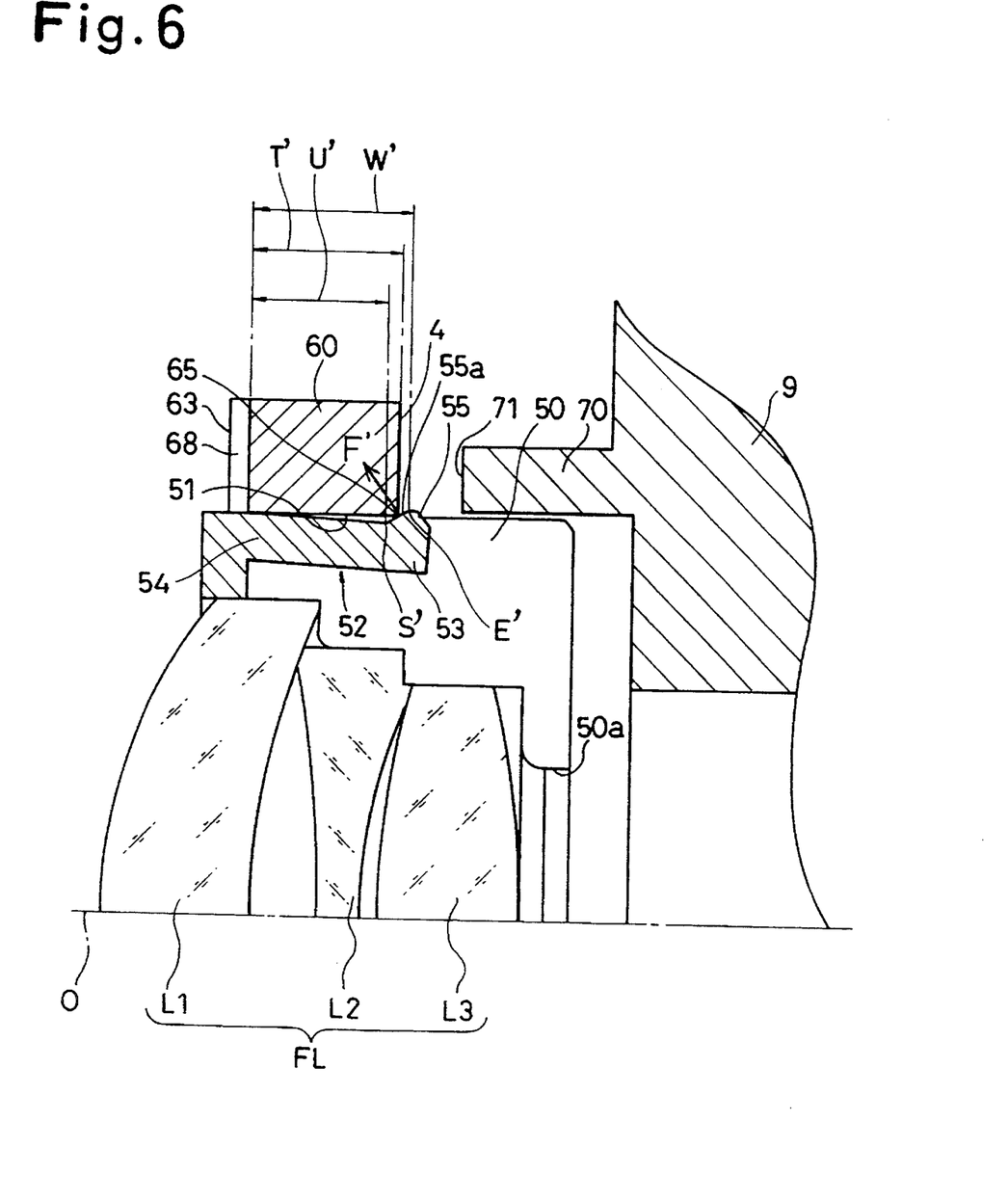

FIGS. 5 and 6 show another embodiment of a position adjusting apparatus according to the present invention applied to a lens shutter type camera having an automatic focusing mechanism, in which the focusing is carried out by the axial movement of the focusing ring 60 in the right and left directions in FIG. 5. In FIG. 5, the elements corresponding to those in the first embodiment shown in FIG. 1 are designated by like reference numerals.

The position adjusting apparatus includes a lens frame 50, a focusing ring (focus adjusting ring) 60 in which the lens frame 50 is fitted, and a stationary ring 70 which rotatably supports the lens frame 50. Upon adjustment of the lens position during the assembling of the camera, the position of the lens frame 50 relative to the stationary ring 70 in the direction of the optical axis O is first adjusted, and thereafter, the lens frame 50 is adhered to the focusing ring 60 by means of an adhesive.

The stationary ring 70 which is secured to the securing portion 9 of the camera body is provided on the front end thereof with an end surface 71. The lens frame 50 holds therein the focusing lens group FL consisting of the first, second and third lenses L1, L2 and L3 in this order from the object side, as in the first embodiment. The lens frame 50 is provided with an opening 50a which is located behind the third lens L3. The lens frame 50 is slidably fitted at the rear end thereof in the inner peripheral surface of the stationary ring 70.

The lens frame 50 has three elastically deformable legs 52 integral therewith, which are spaced at an equi-angular distance along the circumference of a circle whose center is located on the optical axis O and which extend in the direction parallel with the optical axis O. The legs 12 have front ends 54 integral with the lens frame 50 and free ends 53 (rear ends) which extend rearwardly from the front ends. The free ends 53 are provided with bulged portions (projections) 55 that project therefrom in the radial and outward directions. The bulged portions 55 are provided on the front side thereof with oblique surfaces 55a which are gradually tapered in the radial and outward directions toward the rear side thereof. The projections 55 are shaped to correspond to cam surfaces 69 formed on the focusing ring 60, as shown in FIG. 5.

The lens frame 50 is made of, for example, synthetic resin, so that the legs 52 can be elastically deformed or deflected in the direction perpendicular to the optical axis O at the fulcrum defined by the front ends 54 of the legs 52.

The lens frame 50 is provided with three radially and outwardly projecting projections 56 which are spaced at an equi-angular distance along the circumference of a circle whose center is located on the optical axis O. The projections 56 are formed on the outer peripheral surface 50b of the lens frame 50 at the front end thereof.

The lens frame 50 is provided with two forwardly projecting pins 57 on any two of the three projections 56.

The focusing ring 60 is linearly moved in the optical axis direction through an axial displacement corresponding to an object distance which is measured by a photometer (not shown), by a driving mechanism (not shown) using a well known cam, etc. The focusing ring 60 is fitted on the lens frame 50. After the positional adjustment of the lens is completed, if the focusing ring 60 secured to the lens frame 50 is moved in the optical axis direction O, the lens frame 50 is also axially moved, so that the focusing lens group FL is moved in the optical axis direction. Thus, the focusing is performed upon taking a picture.

The focusing ring 60 is provided on the front end surface 63 thereof with three first cam surfaces 68 which extend along the circumference of the circle whose center is located on the optical axis O and which are spaced at an equi-angular distance in the circumferential direction. Each of the cam surfaces 68 is inclined from one end 68a thereof toward the other end 68b, along the circumferential direction. That is, the depth of each cam surface 68 gradually increases from the one end 68a toward the other end 68b (toward the rear side). The projections 56 abut against the corresponding cam surfaces 68.

The focusing ring 60 is also provided on the rear end surface 64 thereof with three second cam surfaces 69 which extend along the circumference of the circle whose center is located on the optical axis O and which are spaced at an equi-angular distance in the circumferential direction. Each of the cam surfaces 69 is inclined from one end 69a thereof toward the other end 69b, along the circumferential direction. That is, the depth of each cam surface 69 gradually increases from the one end 69a toward the other end 69b (toward the front side). The projections 55 of the elastically deformable legs 52 abut against the corresponding cam surfaces 69, respectively. The first and second cam surfaces 68 and 69 are formed on the focusing ring 60 so that the corresponding first and second cam surfaces 68 and 69, respectively, are opposed in the optical axis direction and extend in parallel with each other, as can be seen in FIG. 5.

When the focusing ring 60 is appropriately fitted onto the lens frame 50, the cam surfaces 68 formed on the front end surface 63 of the focusing ring 60 abut against the corresponding projections 56, and the edge portion 65 of the focusing ring 60 defined by and between the cam surfaces 69 formed on the rear end surface 64 and the inner peripheral surface 51 thereof abuts against the inclined surfaces 55a of the elastically deformable legs 52. As can be seen in FIG. 6, the length U' of the portions of the elastically deformable legs 52 that are defined between the cam surfaces 69 and the start points S' of the oblique surfaces 55a is shorter than the axial length T' of the focusing ring 60 in the optical axis direction O. The length W' of the portions of the elastically deformable legs 52 that are defined between the cam surfaces 68 and the terminal points E' of the oblique surfaces 55a is longer than the axial length T' of the focusing ring 60, i.e. U'<T'<W'.

With this arrangement, when the focusing ring 60 is properly fitted on the lens frame 50, the latter is pressed against the focusing ring 60 in such a way that the oblique surfaces 55a of the legs 52 are pressed against the edge portion 65, that is, the elastically deformable legs 52 are slightly and elastically deflected or bent toward the optical axis O. Moreover, the press contact of the oblique surfaces 55a with the edge portion 65 causes the front end surface 63 of the focusing ring 60 to come into press contact with the projections 56. In this state, when the lens frame 50 is rotated, a rotation of the focusing ring 60 also takes place due to the frictional force F' produced between the edge portion 65 and the oblique surfaces 55a and between the front end surface 63 and the projections 56.

The position adjusting apparatus for a lens in a camera, as constructed above operates as follows.

Similarly to the first embodiment illustrated in FIG. 1, the axial adjustment of the lens frame 50 with respect to the stationary ring 70 is effected using a generally Y-shaped adjusting tool 40 as shown in FIG. 4. Namely, during the adjustment, the focusing ring 60 is held by a support or an engaging member (not shown) to move together with the lens frame 50 in the optical axis direction without rotating about the optical axis O.

When the handle 41 is rotated about the optical axis O against the frictional force F' while engaging the pins 57 in the corresponding grooves 43 of the tool 40, the lens frame 50 is rotated. The rotation of the lens frame 50 causes the projections 56 to slide on the cam surfaces 68 while moving the oblique surfaces 55a on the edge portion 65 to thereby vary the position of the lens frame 50 with respect to the focusing ring 60. Namely, the lens frame 50 is moved in the optical axis direction by rotating the lens frame 50 by the tool 40 to thereby adjust the axial position of the lens frame with respect to the stationary ring 70.

In the second embodiment, the cam surfaces 68, the edge portion 65, the projections 56 and the oblique surfaces 55a constitute a guide mechanism.

After the adjustment of the axial position of the lens frame 50 with respect to the stationary ring 70 is completed, the tool 40 is removed, and thereafter, the lens frame 50 is adhered to the focusing ring 70 by an adhesive (not shown). After that, the support or engaging member (not shown) which supports the focusing ring 60 so as not to rotate is disengaged. Thus, the positional adjustment ends.

According to the second embodiment, since the elastically deformable legs 52 are continuously pressed against the focusing ring 60 even if the adjusting tool 40 is removed after the adjustment of the lens frame 50 relative to the stationary ring 70 in the optical axis direction is completed, no accidental movement of the lens frame 50 occurs so long as the lens frame 50 is not rotated with respect to the focusing ring 60 against the frictional force F'. Thus, the same technical advantage as that of the first embodiment can be obtained in the second embodiment.

If the focusing ring 60 is secured to the stationary ring 70 in the embodiment illustrated in FIG. 5, a position adjusting apparatus for a pan-focus type of lens shutter camera having the same effect as that of the first embodiment can be provided. In this alternative, the focusing ring 60 and the stationary ring 70 constitute a single lens frame supporting member, so that the lens frame 50 can be appropriately adjusted with respect to the lens frame supporting member, during the positional adjustment of the lens. Thereafter, the lens frame 50 is adhered to the lens frame supporting member by an adhesive. After the adjustment is completed, the focusing lens group FL constitutes a stationary lens group permanently secured to the securing portion 9 of the camera body.

As can be understood from the above discussion, according to the present invention, since there is provided the lens frame supporting member which is rotatable with respect to the lens frame, the guide mechanism for moving the lens frame in the optical axis direction during the rotational movement thereof, and the frictional mechanism which normally prevents the lens frame from rotating relative to the lens frame supporting member and permits the lens frame to rotate relative to the lens frame supporting member only when an external adjusting force above a predetermined value is applied thereto, the axial position of the lens group in a lens shutter type camera can be easily adjusted by a simple mechanism comprised of a fewer number of components.

We claim:

1. A position adjusting apparatus for adjusting a position of a lens frame of a camera in an optical axis direction, said lens frame holding a focusing lens group, said apparatus comprising:

a lens frame supporting member which is rotatable relative to said lens frame for rotational adjustment of said lens frame;

a guide mechanism which controls movement of said lens frame in the optical axis direction during the rotational adjustment of said lens frame; and, a friction mechanism which provides a frictional force between said lens frame and said lens frame supporting member to prevent said lens frame and said lens frame supporting member from rotating relative to each other, said friction mechanism permits said lens frame and said lens frame supporting member to rotate relative to each other for rotational adjustment of said lens frame when a predetermined adjusting force is applied to overcome said frictional force, said frictional force maintaining said lens frame and said lens frame supporting member in an adjusted position relative to each other upon removal of said predetermined adjusting force.

2. A position adjusting apparatus according to claim 1, wherein said lens frame supporting member comprises a focusing ring which is rotatable with respect to said lens frame.

3. A position adjusting apparatus according to claim 2, wherein said focusing ring is rotated in accordance with object distance data.

4. A position adjusting apparatus according to claim 2, wherein said focusing ring is moved in the optical axis direction in accordance with object distance data.

5. A position adjusting apparatus according to claim 1, further comprising a stationary member which rotatably supports said lens frame.

6. A position adjusting apparatus according to claim 5, wherein said guide mechanism is provided between said lens frame supporting member and said lens frame.

7. A position adjusting apparatus according to claim 6, wherein said guide mechanism comprises a cam mechanism.

8. A position adjusting apparatus according to claim 5, wherein said guide mechanism is provided between said lens frame and said stationary member.

9. A position adjusting apparatus according to claim 8, wherein said guide mechanism comprises a cam mechanism.

10. A position adjusting apparatus according to claim 2, further comprising a stationary member which rotatably supports said lens frame.

11. A position adjusting apparatus according to claim 10, wherein said guide mechanism is provided between said lens frame and said focusing ring.

12. A position adjusting apparatus according to claim 1, wherein said friction mechanism is comprised of at least one elastically deformable leg which is provided on said lens frame to come into press contact with said lens frame supporting member.

13. A position adjusting apparatus according to claim 1, wherein said lens frame is adhered to said lens frame supporting member in the adjusted position by an adhesive.

14. A focus adjusting mechanism of a camera, said mechanism comprising:

a focusing ring, said ring mounted for rotation to perform a focusing operation;

a lens frame supporting a plurality of focusing lenses;

a friction mechanism generating a frictional force that prevents said lens frame and said focusing ring from relative rotation during a photographing operation and from relative movement along an optical axis direction during the photographing operation;

a guide mechanism for controlling movement of said lens frame relative to said focusing ring along the optical axis direction;

wherein said friction mechanism permits relative rotation and relative movement of said lens frame along the optical axis with respect to said focusing ring, said relative rotation and relative movement being controlled by said guide mechanism, said relative rotation and relative movement being permitted by said friction mechanism when a predetermined adjusting force is applied to said lens frame to overcome a frictional force of said friction mechanism.

15. The position adjusting apparatus according to claim 14, said focusing ring being rotated in accordance with object distance data during the photographing operation.

16. The position adjusting apparatus according to claim 14, said focusing ring being moved in the optical axis direction in accordance with object distance data during the photographing operation.

17. The position adjusting apparatus according to claim 14, said guide mechanism being provided between said focusing ring and said lens frame.

18. The position adjusting apparatus according to claim 17, said guide mechanism comprising a cam mechanism.

19. The position adjusting apparatus according to claim 14, said friction mechanism comprising at least one elastically deformable leg extending from said lens frame along the optical axis direction and having a free end in contact with said focusing ring to prevent rotation and axial movement between said focusing ring and said lens frame.

20. The position adjusting apparatus according to claim 19, said at least one elastically deformable leg comprising a plurality of elastically deformable legs circumferentially spaced about the optical axis.

\* \* \* \* \*